(12) United States Patent
Zhou et al.

(10) Patent No.: US 10,973,025 B1
(45) Date of Patent: Apr. 6, 2021

(54) ENHANCED PUSCH IN UPLINK CARRIER AGGREGATION

(71) Applicants: Yu Zhou, Herndon, VA (US); Muhammad Ahsan Naim, Sterling, VA (US); Volkan Sevindik, Fairfax, VA (US)

(72) Inventors: Yu Zhou, Herndon, VA (US); Muhammad Ahsan Naim, Sterling, VA (US); Volkan Sevindik, Fairfax, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 879 days.

(21) Appl. No.: 14/565,408

(22) Filed: Dec. 9, 2014

(51) Int. Cl.
*H04W 72/04* (2009.01)

(52) U.S. Cl.
CPC ... *H04W 72/0453* (2013.01); *H04W 72/0413* (2013.01)

(58) Field of Classification Search
CPC ............ H04W 72/0453; H04W 72/0413
See application file for complete search history.

(56) References Cited

U.S. PATENT DOCUMENTS

| | | | | |
|---|---|---|---|---|
| 2011/0141928 A1* | 6/2011 | Shin | | H04L 5/0053 370/252 |
| 2012/0057449 A1* | 3/2012 | Takaoka | | H04B 1/713 370/210 |
| 2012/0140717 A1* | 6/2012 | Zhu | | H04L 5/001 370/329 |
| 2013/0250925 A1* | 9/2013 | Lohr | | H04W 72/0446 370/336 |
| 2015/0373693 A1* | 12/2015 | Wang | | H04W 72/0406 370/329 |

OTHER PUBLICATIONS

The CA in LTE-Advanced is designed to support aggregation of a variety of different arrangements of component carriers (CCs), including CCs of the same or different bandwidths, contiguous or non—contiguous CCs in the same frequency band, and CCs in different frequency bands (Year: 2012).*

Q. Zeng, Z. Shi, W. Wang and Z. Hu, "Analyses of Interferences between Component Carriers in Carrier Aggregation," 2011 Third International Conference on Communications and Mobile Computing, Qingdao, 2011, pp. 420-423, doi: 10.1109/CMC.2011.102. (Year: 2011).*

(Continued)

*Primary Examiner* — Thinh D Tran

(57) ABSTRACT

Disclosed herein are systems and methods for allocating bandwidth in a wireless network comprising an aggregated uplink carrier formed from a plurality of contiguous uplink component carriers. In some embodiments, a base station allocates bandwidth for UE (User Equipment devices) transmissions within the aggregated uplink carrier during an upcoming TTI (Transmission Time Interval), wherein for the upcoming TTI, the aggregated uplink carrier has an enhanced subframe format with an enhanced PUSCH (Physical Uplink Shared Channel) region that maps to a continuous frequency range extending across one or more frequency boundaries between one or more of the plurality of uplink component carriers.

20 Claims, 4 Drawing Sheets

(56) References Cited

OTHER PUBLICATIONS

G. Yuan, X. Zhang, W. Wang and Y. Yang, "Carrier aggregation for LTE-advanced mobile communication systems," in IEEE Communications Magazine, vol. 48, No. 2, pp. 88-93, Feb. 2010, doi: 10.1109/MCOM.2010.5402669. (Year: 2010).*

I. Shayea, M. Ismail and R. Nordin, "Capacity evaluation of Carrier Aggregation techniques in LTE-Advanced system," 2012 International Conference on Computer and Communication Engineering (ICCCE), Kuala Lumpur, 2012, pp. 99-103, doi: 10.1109/ICCCE.2012.6271160. (Year: 2012).*

\* cited by examiner

US 10,973,025 B1

ENHANCED PUSCH IN UPLINK CARRIER AGGREGATION

BACKGROUND

Unless otherwise indicated herein, the description in this section is not itself prior art to the claims and is not admitted to be prior art by inclusion in this section.

Cellular wireless networks typically include a number of base stations that radiate to define wireless coverage areas, such as cells and/or cell sectors, in which user equipment devices (UEs) (also known as wireless communication devices (WCDs)) such as cell phones, "smart" phones, tablet computers, tracking devices, embedded wireless modules, and other wirelessly equipped communication devices, can operate. Each base station is coupled to network infrastructure that provides connectivity with one or more transport networks, such as the public switched telephone network (PSTN) for voice communications and/or the Internet for voice and/or data communications.

In general, a wireless network operates in accordance with a particular air interface protocol or radio access technology, with communications from the base stations to UEs defining a downlink or forward link and communications from the UEs to the base stations defining an uplink or reverse link. Examples of existing air interface protocols include, without limitation, Orthogonal Frequency Division Multiple Access (OFDMA (e.g., Long Term Evolution (LTE) or Wireless Interoperability for Microwave Access (WiMAX)), Code Division Multiple Access (CDMA) (e.g., 1×RTT and 1×EV-DO), and Global System for Mobile Communications (GSM), among others.

Each air interface protocol has its own frame structure for transmissions on physical uplink and downlink channels. Each air interface protocol also defines its own procedures for allocating transmission resources within the uplink and downlink channels for transmitting and receiving control data (e.g., messaging send between UEs and base stations for controlling access to the radio network) and user data (e.g., VoIP, email, Internet browsing, file downloads/uploads).

In LTE networks, for example, the downlink direction (from the base station to the UE) uses Orthogonal Frequency Division Multiple Access (OFDMA), which is a multi-carrier scheme based on Orthogonal Frequency Division Multiplexing (OFDM) whereby radio resources are allocated to multiple users. In operation, a downlink carrier's frequency bandwidth is split into many small 15 kHz subcarriers, and each individual subcarrier is modulated using, for example, QPSK (Quadrature Phase-Shift Keying), 16-QAM (Quadrature Amplitude Modulation), 64-QAM, or perhaps other digital modulation schemes.

In the uplink direction (from the UE to the base station), LTE uses a pre-coded version of OFDM known as Single Carrier Frequency Division Multiple Access (SC-FDMA), where data is spread across the subcarriers of multiple LTE resource blocks, which can then be modulated using, for example, QPSK, 16-QAM, 64-QAM, or perhaps other digital modulation schemes. By transforming the time domain symbols to the frequency domain with a discrete Fourier transform (DFT) before OFDM modulation, SC-FDMA creates a single-carrier waveform (i.e., the SC aspect of SC-FDMA) that is then frequency-shifted to the desired part of the frequency domain in the uplink carrier (i.e., the FDMA aspect of SC-FDMA) for transmission by the UE.

SUMMARY

Some wireless network implementations use carrier aggregation on an uplink and/or downlink in a cell to increase the bandwidth for transmissions between a base station and UEs in the cell. For carrier aggregation, multiple component carriers are combined to form an aggregated carrier having a bandwidth equal to the sum of the component carriers. For example, two 5 MHz downlink carriers can be combined to form a single 10 MHz aggregated downlink carrier. Similarly, three 2.5 MHz uplink carriers can be combined to form a single 7.5 MHz aggregated uplink carrier.

In LTE, an aggregated carrier can be formed from (i) multiple contiguous component carriers in the same LTE band, (ii) multiple non-contiguous component carriers in the same LTE band, or (iii) multiple non-contiguous component carriers in different LTE bands. LTE currently allows for up to five individual 20 MHz component carriers to be combined into one 100 MHz aggregated carrier. Some LTE network implementations may support other combinations of two to five 1.4 MHz, 3 MHz, 5 MHz, 10 MHz, 15 MHz, or 20 MHz uplink component carriers to be aggregated into a single aggregated uplink carrier.

In LTE, each subframe in an uplink carrier includes specific resource blocks reserved for control data sent from UEs to the base station and other specific resource blocks reserved for allocation to user data (e.g., data for VoIP, Internet browsing, email, etc.) sent from UEs to the base station. Each LTE resource block in the subframe maps to a group of twelve 15 kHz subcarriers in the uplink carrier.

For control data, the uplink carrier in each LTE subframe includes upper and lower resource blocks reserved for the PUCCH (Physical Uplink Control Channel) that carries Uplink Control Information (UCI), such as channel quality indication (CQI), ACK/NACK responses of the UE to the HARQ (Hybrid Automatic Repeat Request) mechanism, and uplink scheduling requests from UEs to the base station. The upper resource blocks reserved for the PUCCH (also referred to as the upper PUCCH region of the subframe) map to subcarriers near the upper end of the uplink carrier, and the lower resource blocks reserved for the PUCCH (also referred to as the lower PUCCH region of the subframe) map to subcarriers located at the lower end of the uplink carrier.

For user data, each LTE subframe includes a set of resource blocks reserved for the PUSCH (Physical Uplink Shared Channel). These resource blocks are sometimes referred to as the PUSCH region of the subframe. Within the LTE subframe, the PUSCH region is bookended by the upper and lower PUCCH regions. Like the resource blocks in the PUCCH regions, each resource block in the PUSCH region also maps to a group of twelve 15 kHz subcarriers in the uplink carrier. The resource blocks in the PUSCH region constitute the majority of the resource blocks in the subframe, and thus, the majority of the subcarriers within the uplink carrier.

For each uplink TTI (Transmission Time Interval), the base station allocates specific resource blocks in the PUSCH region to individual UEs for transmitting user data on the uplink from the UEs to the base station. In operation, an LTE base station (i.e., an eNodeB) runs an uplink scheduling algorithm that allocates resource blocks in the PUSCH region of the subframe to individual UEs for uplink transmissions during an upcoming TTI. Because each resource block corresponds to a group of twelve 15 kHz subcarriers in the uplink carrier, allocating resource blocks to individual UEs amounts to allocating bandwidth in the uplink carrier to those UEs.

When multiple uplink carriers are combined to form a single aggregated uplink carrier, each uplink component carrier of the aggregated uplink carrier retains its resource block reservations in its subframe for its upper PUCCH region, its lower PUCCH region, and its PUSCH region. Maintaining the same PUCCH and PUSCH regions in each of the multiple uplink component carriers that form the aggregated uplink carrier enables backwards compatibility with older UEs that may not support carrier aggregation, because it allows those older UEs to transmit data on at least one of the uplink component carriers of the aggregated uplink carrier without requiring specific details about the aggregated uplink carrier. Maintaining the same PUCCH and PUSCH regions in each of the multiple uplink component carriers that form the aggregated uplink carrier also enables base stations and UEs to implement uplink carrier aggregation in a standard fashion regardless of whether the uplink component carriers that form the aggregated uplink carrier are contiguous component carriers in the same LTE band, non-contiguous component carriers in the same LTE band, or non-contiguous component carriers in different LTE bands.

But when an aggregated uplink carrier is formed from multiple contiguous uplink component carriers (i.e., two or more uplink carriers that are adjacent to one another in the frequency domain), one drawback to maintaining the same PUCCH and PUSCH regions in each of the multiple contiguous uplink component carriers is that the subframe of the resulting aggregated uplink carrier has multiple separate PUSCH regions (one separate PUSCH region for each uplink component carrier) because the PUSCH region of each uplink component carrier is bookended by the upper and lower PUCCH regions for that uplink component carrier. Having PUSCH regions separated by PUCCH regions in the subframe for the aggregated uplink carrier limits the maximum bandwidth for individual SC-FDMA transmissions within the aggregated uplink carrier to the maximum bandwidth corresponding to the number of contiguous resource blocks in the largest of the separate PUSCH regions. Multiple SC-FDMA transmissions from the same UE also increase the peak-to-average power ratio (PAPR) and reduce the transmission efficiency.

For example, consider an aggregated uplink carrier formed from two contiguous component carriers (an upper component carrier and a lower component carrier), where each component carrier has a PUSCH region containing 10 resource blocks. In this example, there are 20 total resource blocks in the two PUSCH regions in the aggregated uplink carrier. However, the largest number of contiguous resource blocks in any PUSCH region in the aggregated uplink carrier is 10. The 10 resource blocks of the PUSCH region in the lower component carrier are not contiguous with the 10 resource blocks of the PUSCH region in the upper component carrier. Instead, the 10 resource blocks of the PUSCH region in the upper component carrier are separated from the 10 resource blocks of the PUSCH region in the lower component carrier by both (i) the lower PUCCH region of the upper component carrier and (ii) the upper PUCCH region of the lower component carrier. Because the maximum number of contiguous resource blocks is 10, the maximum bandwidth of a single carrier for an SC-FDMA transmission within the aggregated uplink carrier 1.8 MHz (i.e., 10 resource blocks×12 subcarriers per resource block× 15 kHz per subcarrier=1.8 MHz).

But if the resource blocks for the two PUSCH regions from the upper and lower component carriers were contiguous (i.e., not separated by resource blocks in the PUCCH regions), then the maximum bandwidth of a single carrier for an SC-FDMA transmission within the aggregated uplink carrier would be 3.6 MHz (i.e., 20 resource blocks×12 subcarriers per resource block×15 kHz per subcarrier). In addition to enabling higher bandwidth SC-FDMA transmissions within the aggregated uplink carrier, making all the resource blocks in the PUSCH of an aggregated uplink carrier contiguous also enables the uplink scheduler in the base station to assign resource blocks more efficiently and flexibly for SC-FDMA transmissions in the aggregated uplink carrier because the uplink scheduler can deal with one contiguous set of 20 resource blocks for each TTI rather than two separate sets of 10 resource blocks for each TTI.

The systems and methods disclosed herein relate to allocating transmission resources (e.g., bandwidth in the form of resource blocks/groups of subcarriers) in an aggregated uplink carrier having an enhanced subframe format that has a single PUSCH region (sometimes referred to herein as an enhanced PUSCH region) which includes a contiguous range of resource blocks. The contiguous range of resource blocks maps to a contiguous range of subcarriers that extends across one or more frequency boundaries of the plurality of uplink component carriers of the aggregated uplink carrier. Thus, in operation, the enhanced PUSCH region maps to a continuous frequency range in the aggregated uplink carrier that extends across one or more frequency boundaries between one or more of the plurality of uplink component carriers that make up the aggregated uplink carrier.

For example, instead of the subframe of the aggregated uplink carrier including M separate PUSCH regions for each of the M uplink component carriers where each PUSCH region for each uplink component carrier has N contiguous resource blocks (i.e., M separate PUSCH regions, each having N contiguous resource blocks), the enhanced subframe format has a single PUSCH region where all of the resource blocks from the M uplink component carriers are combined into a single contiguous set of resource blocks (i.e., one single PUSCH region having M×N contiguous resource blocks).

Some embodiments include, in an LTE wireless network comprising an aggregated uplink carrier formed from a plurality of contiguous uplink component carriers in a wireless cell, a base station allocating bandwidth for UE transmissions within the aggregated uplink carrier for an upcoming first TTI, wherein for the upcoming first TTI, the aggregated uplink carrier has the enhanced subframe format described above. Some embodiments also include the base station allocating bandwidth for UE transmissions in the aggregated uplink carrier for an upcoming second TTI, wherein for the upcoming second TTI, the aggregated uplink carrier has a non-enhanced subframe format comprising a separate PUSCH for each uplink component carrier in the aggregated uplink carrier.

In some embodiments, the base station may change the subframe format of the aggregated uplink carrier from TTI to TTI between the enhanced subframe format and the non-enhanced subframe format. In operation, the base station may allocate bandwidth for UE transmissions in the aggregated uplink carrier, wherein for some TTIs, the aggregated uplink carrier has the enhanced subframe format and for other TTIs, the aggregated uplink carrier has the non-enhanced subframe format. In some embodiments, the base station broadcasts messages on one or more downlink PBCH (Physical Broadcast Channels) associated with the aggregated uplink carrier to inform UEs about (i) upcoming TTIs during which to use the enhanced subframe format and (ii) upcoming TTIs during which to use the non-enhanced subframe format. In some embodiments, the base station may send system parameter settings in one or more SIB (System Information Block) messages to UEs to instruct the UEs whether to use the enhanced or the non-enhanced subframe format for upcoming TTIs. The base station may be further configured to choose which upcoming TTIs during which to use the enhanced subframe format and which upcoming TTIs during which to use the non-enhanced subframe format. In operation, the base station's choice of the enhanced subframe format or the non-enhanced subframe format for particular upcoming TTIs may be based at least in part on how many UEs in the cell are capable of utilizing the enhanced subframe format.

This overview is illustrative only and is not intended to be limiting. In addition to the illustrative aspects, embodiments, and features described herein, further aspects, embodiments, and features will become apparent by reference to the figures and the following detailed description. The features and advantages of the disclosed systems and methods, as well as other aspects, advantages, and alternatives will become apparent to those of ordinary skill in the art by reading the following detailed description, with reference where appropriate to the accompanying drawings.

DETAILED DESCRIPTION

The systems and methods described herein are set forth only as examples. As such, those skilled in the art will appreciate that other arrangements and element (e.g., machines, interfaces, functions, orders, and groupings of functions) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For example, one or more processors executing instructions stored in memory may implement one or more of the features and functions described herein.

Figure 1:
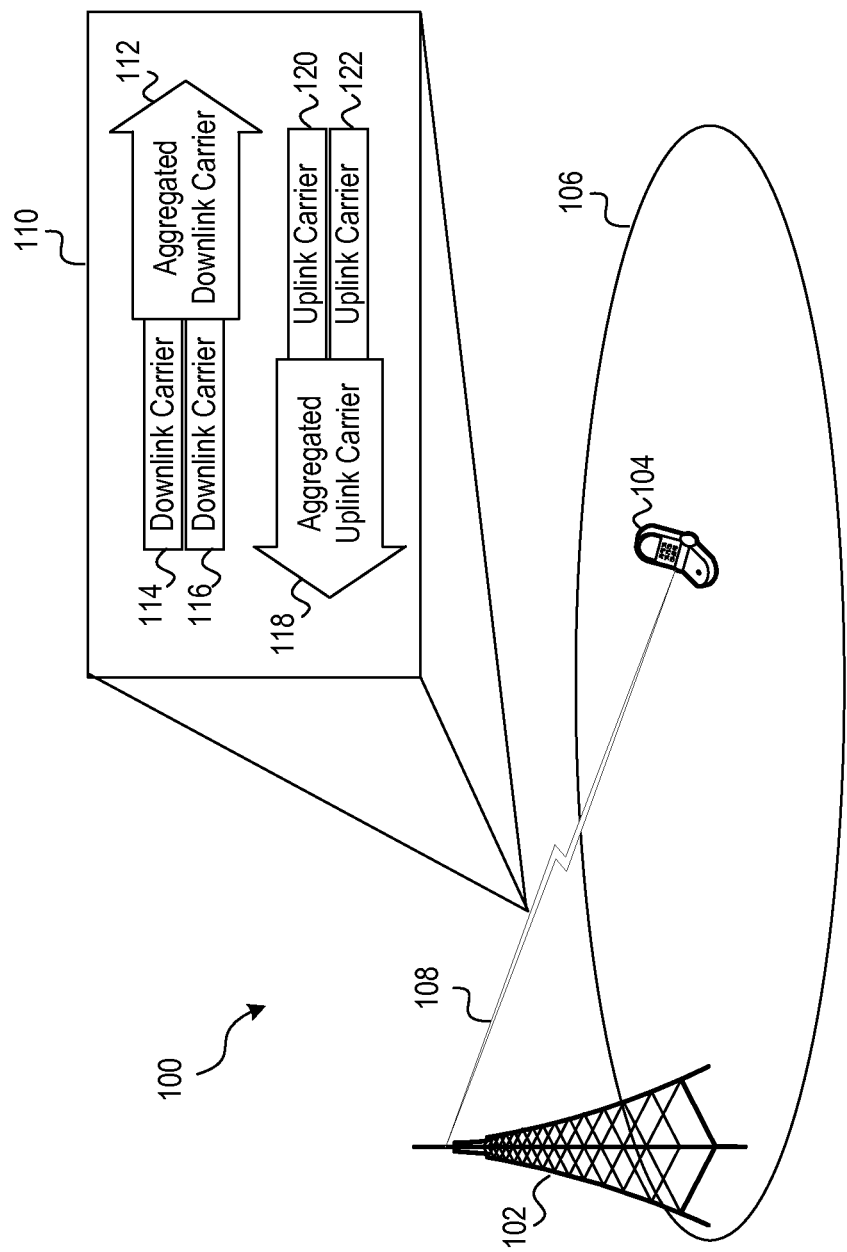
FIG. 1 is a simplified network diagram of an example wireless network configured for uplink carrier aggregation transmissions according to embodiments of the systems and methods described herein.

FIG. 1 is a simplified network diagram of an example wireless network 100 configured for uplink carrier aggregation transmissions according to embodiments of the systems and methods described herein. Wireless network 100 includes a base station 102 providing wireless service to a UE 104 in a wireless cell 106 over a wireless communication link 108.

Base station 102 may include a base transceiver station (BTS), an access node, node-B, eNodeB (eNB), and/or other supporting network infrastructure for providing wireless service in wireless cell 106 and perhaps one or more additional wireless cells (not shown). In the example shown in FIG. 1, the wireless network 100 is an LTE network and the base station 102 is an eNodeB. However, in other embodiments, the wireless network 100 may additionally or alternatively operate according to other wireless protocols including but not limited to any of the wireless protocols disclosed herein.

The base station 102 in wireless network 100 is configured to utilize carrier aggregation on wireless link 108 to increase the available bandwidth of the wireless service that the base station 102 provides to UE 104 in cell 106. As noted above, carrier aggregation (i) increases downlink bandwidth by combining multiple downlink component carriers into a single aggregated downlink carrier and/or (ii) increases uplink bandwidth by combining multiple uplink component carriers into a single aggregated uplink carrier.

Box 110 shows a simplified diagram of the downlink and uplink carrier aggregation configuration for communications link 108. In particular, aggregated downlink carrier 112 includes two downlink component carriers (i.e., downlink component carrier 114 and downlink component carrier 116) from the base station 102 to the UE 104, and aggregated uplink carrier 118 includes two uplink component carriers (i.e., uplink component carrier 120 and uplink component carrier 122) from the UE 104 to the base station 102. In operation, the base station 102 uses OFDMA for downlink transmissions on the aggregated downlink carrier 112 to the UE 104, and the UE 104 uses SC-FDMA for its uplink transmissions on the aggregated uplink carrier 118 to the base station 102.

The example in FIG. 1 shows the aggregated downlink carrier 112 containing two downlink component carriers and the aggregated uplink carrier 118 containing two uplink component carriers. However, other embodiments may utilize carrier aggregation on only the uplink or only the downlink. Likewise, in some embodiments, an aggregated uplink carrier may contain more than two uplink component carriers (e.g., up to five or perhaps more uplink component carriers), and an aggregated downlink carrier may contain more than two downlink component carriers (e.g., up to five or perhaps more downlink component carriers). Typically, a network operator decides whether a wireless network cell (or a base station providing wireless service in the cell) will employ carrier aggregation on either or both of the uplink and downlink, and if so, the number of component carriers to aggregate for the uplink and/or downlink. Alternatively, a base station could dynamically implement carrier aggregation on the uplink or downlink based on various factors.

Figure 2:
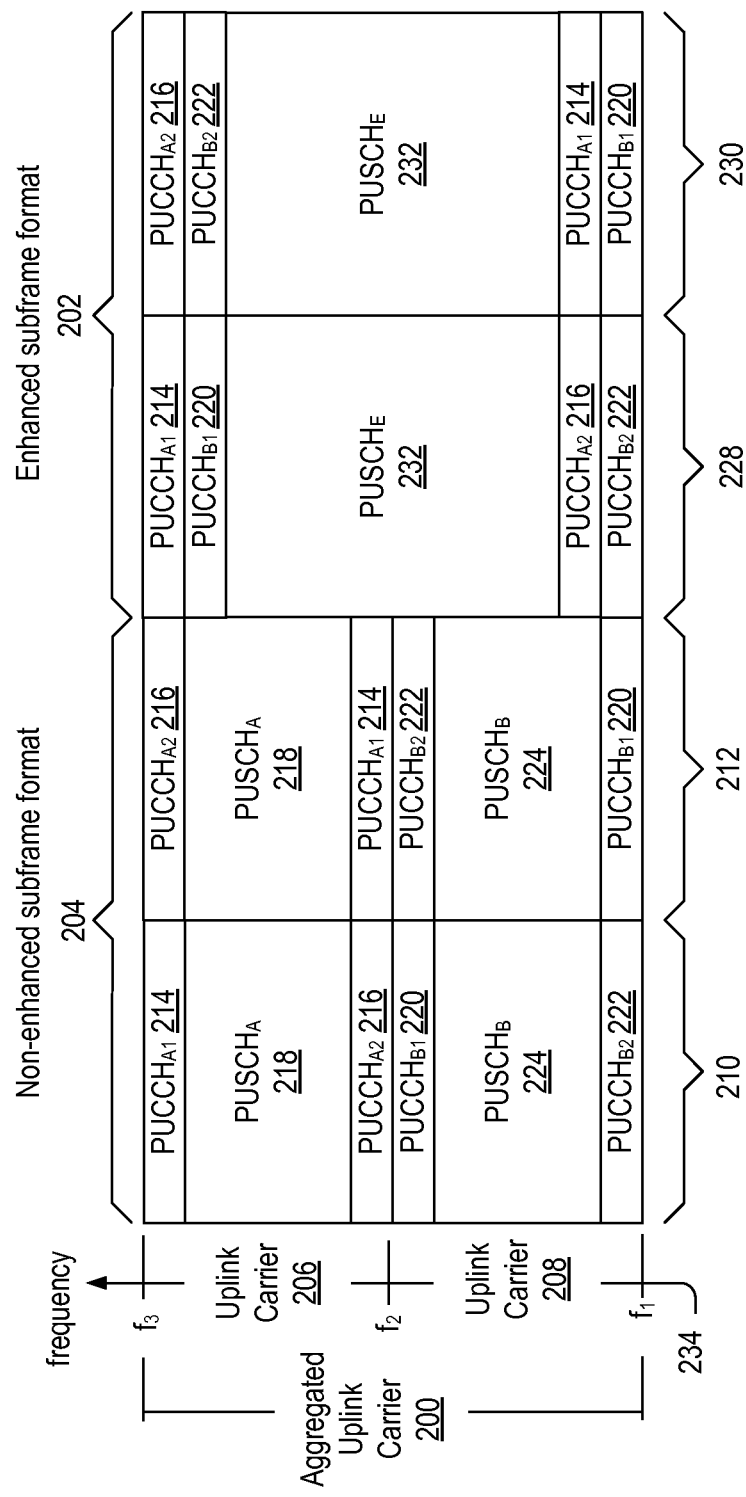
FIG. 2 is a simplified diagram of example enhanced and non-enhanced subframe formats for an aggregated uplink carrier according to some embodiments of the disclosed systems and methods.

FIG. 2 is a simplified diagram of example enhanced and non-enhanced subframe formats for an aggregated uplink carrier according to some embodiments of the disclosed systems and methods. In operation, an LTE UE transmits data in one subframe (either the enhanced subframe or the non-enhanced subframe) during one TTI (Transmission Time Interval) on the uplink from the UE to the LTE eNodeB. The different regions of the subframe formats shown in FIG. 2 correspond to sets of one or more LTE resource blocks. Each LTE resource block in a particular region corresponds to a group of twelve 15 kHz subcarriers located at a particular 180 kHz frequency range (12×15 kHz=180 kHz) within the aggregated uplink carrier 200, which is formed from uplink component carrier 206 and uplink component carrier 208. Thus, for a single TTI, the regions of the enhanced subframe format 202 and the non-enhanced subframe format 204 correspond to sets of resource blocks, frequency ranges in the aggregated uplink carrier 200, and frequency ranges within the component uplink carriers 206, 208 that form the aggregated uplink carrier 200.

The vertical axis 234 on the left side of FIG. 2 shows frequency from lower frequencies at the bottom to higher frequencies at the top. The aggregated uplink carrier 200 has a bandwidth of $f_3$-$f_1$ and includes two uplink component carriers: (i) uplink component carrier 206 having a bandwidth of $f_3$-$f_2$ and (ii) uplink component carrier 208 having a bandwidth of $f_2$-$f_1$. Uplink component carrier 206 is adjacent to (and contiguous with) uplink component carrier 208 in the frequency domain. In some embodiments, uplink component carrier 206 is a 2.5 MHz LTE carrier, and uplink component carrier 206 is also a 2.5 MHz LTE carrier. However, in other embodiments, the bandwidth of uplink component carrier 206 may be different than the bandwidth of uplink component carrier 208. Similarly, the bandwidth of uplink component carrier 206 or uplink component carrier 208 may be some value other than 2.5 MHz, e.g., 1.4 MHz, 3 MHz, 5 MHz, 10 MHz, 15 MHz, 20 MHz, or perhaps some other bandwidth.

In operation, for the subframe of an upcoming TTI, a base station may allocate transmission resources (i.e., resource blocks/groups of twelve 15 kHz subcarriers) for UE transmissions in the aggregated uplink carrier 200 using either the enhanced subframe format 202 or the non-enhanced subframe format 204. In the non-enhanced subframe format 204, the aggregated uplink carrier 200 has a separate PUSCH region for each of the uplink component carriers 206 and 208 (i.e., PUSCH$_A$ 218 and PUSCH$_B$ 224, respectively). But for the enhanced subframe format 202, the aggregated uplink carrier 200 has an enhanced PUSCH$_E$ 232. The contiguous set of resource blocks in PUSCH$_E$ 232 maps to a contiguous set of subcarrier groups having a frequency range which extends across the frequency boundary between uplink component carrier 206 and uplink component carrier 208, i.e., the enhanced PUSCH region maps to a continuous frequency range that extends across the frequency boundary between uplink component carriers 206 and 208.

After performing the transmission resource allocation for the upcoming TTI, the base station notifies UEs in the wireless cell of the resource allocation for the upcoming TTI. In LTE, an eNodeB notifies each UE receiving wireless service in the cell of the transmission resource allocation for an upcoming TTI in DCI (Downlink Control Information) sent to the UEs in the LTE cell in the PDCCH (Physical Downlink Control Channel). The UEs in the cell receive notification of the resource allocation for the upcoming TTI from the eNodeB, and during that TTI, the UEs transmit data according to the eNodeB's resource allocation. In operation, the eNodeB can allocate resource blocks in either the enhanced subframe format 202 or the non-enhanced subframe format 204. Thus, the enhanced subframe format 202 and the non-enhanced subframe show how the base station may allocate bandwidth (in the form of resource blocks/ groups of 12 15 kHz subcarriers) for UE transmissions for a particular upcoming TTI as well as how a particular UE transmits data during that particular TTI.

In some embodiments, the non-enhanced subframe format 204 may be any of the subframe formats that comply with LTE standards. For some embodiments, the non-enhanced subframe format 204 includes a first half 210 and a second half 212. The first half 210 of the non-enhanced subframe format 204 includes: (i) PUCCH$_{A1}$ 214 at the upper edge of component carrier 206; (ii) PUCCH$_{A2}$ 216 at the lower edge of component carrier 206; (iii) PUSCH$_A$ 218 in the middle of component carrier 206 between PUCCH$_{A1}$ 214 and PUCCH$_{A2}$ 216; (iv) PUCCH$_{B1}$ 220 at the upper edge of component carrier 208; (v) PUCCH$_{B2}$ 222 at the lower edge of component carrier 208; and (vi) PUSCH$_B$ 224 in the middle of component carrier 208 between PUCCH$_{B1}$ 220 and PUCCH$_{B2}$ 222. The second half 212 of the non-enhanced subframe format 204 includes: (i) PUCCH$_{A2}$ 216 at the upper edge of component carrier 206; (ii) PUCCH$_{A1}$ 214 at the lower edge of component carrier 206; (iii) PUSCH$_A$ 218 in the middle of component carrier 206 between PUCCH$_{A2}$ 216 and PUCCH$_{A1}$ 214; (iv) PUCCH$_{B2}$ 222 at the upper edge of component carrier 208; (v) PUCCH$_{B1}$ 220 at the lower edge of component carrier 208; and (vi) PUSCH$_B$ 224 in the middle of component carrier 208 between PUCCH$_{B2}$ 222 and PUCCH$_{B1}$ 220.

The non-enhanced subframe format 204 provides frequency diversity for PUCCH$_{A1}$ 214 and PUCCH$_{A2}$ 216 by (i) reserving transmission resources for PUCCH$_{A1}$ 214 at the upper edge of component carrier 206 in the first half 210 of the non-enhanced subframe and at the lower edge of component carrier 206 in the second half 212 of the non-enhanced subframe, and (ii) reserving transmission resources for PUCCH$_{A2}$ 216 at the lower edge of component carrier 206 in the first half 210 of the non-enhanced subframe and at the upper edge of component carrier 206 in the second half 212 of the non-enhanced subframe. Similarly, the non-enhanced subframe format 204 provides frequency diversity for PUCCH$_{B1}$ 220 and PUCCH$_{B2}$ 220 by (i) reserving transmission resources for PUCCH$_{B1}$ 220 at the upper edge of component carrier 208 in the first half 210 of the non-enhanced subframe and at the lower edge of component carrier 208 during the second half 212 of the non-enhanced subframe, and reserving transmission resources for PUCCH$_{B2}$ 222 at the lower edge of component carrier 208 in the first half 210 of the non-enhanced subframe and at the upper edge of component carrier 208 in the second half 212 of the non-enhanced subframe.

However, reserving resource blocks for PUCCH$_{A1}$ 214 and PUCCH$_{A2}$ 216 at the lower end of component carrier 206 and reserving resource blocks for PUCCH$_{B1}$ 220 and PUCCH$_{B2}$ 222 at the upper end of component carrier 208 fragments the total number of resource blocks (and therefore the uplink spectrum) that can be allocated for individual SC-FDMA transmissions on the aggregated uplink carrier 200. In particular, when the base station allocates resource blocks using the non-enhanced subframe format, the base station can allocate resource blocks from either PUSCH$_A$ 218 or PUSCH$_B$ 224 to a particular UE for an SC-FDMA transmission. However, the base station does not allocate some resource blocks from PUSCH$_A$ 218 and some resource blocks from PUSCH$_B$ 224 to an individual UE for a single SC-FDMA transmission during an individual TTI because (i) resource blocks from PUSCH$_A$ 218 and PUSCH$_B$ 224 are not contiguous and (ii) a single SC-FMDA transmission requires contiguous spectrum in the frequency domain. In the non-enhanced subframe format 204, the PUCCH regions at the lower edge of uplink component carrier 206 and the upper edge of uplink component carrier 208 break up the resource blocks of PUSCH$_A$ 218 and PUSCH$_B$ 224 into two separate and disjoint sets of resource blocks, and thus, two separate and disjoint portions of spectrum in the frequency domain.

The enhanced subframe format 202 enables higher bandwidth SC-FDMA uplink transmissions than the non-enhanced subframe format 204, because the $PUSCH_E$ 232 in the enhanced subframe contains more contiguous resource blocks than either $PUSCH_A$ 218 or $PUSCH_B$ 224 in the non-enhanced subframe. The enhanced subframe format 202 includes an enhanced $PUSCH_E$ 232 with a single set of contiguous resource blocks that maps to a contiguous set of 180 kHz subcarrier groups. The combined frequency range of this contiguous set of 180 kHz subcarrier groups extends across the frequency boundary at $f_2$ between uplink component carrier 206 and uplink component carrier 208. In some embodiments, the enhanced subframe format 202 includes a first half 228 and a second half 230. The first half 228 of the enhanced subframe format includes: (i) PUCCH regions $PUCCH_{A1}$ 214 and $PUCCH_{B1}$ 220 at the upper edge of uplink component carrier 206; (ii) PUCCH regions $PUCCH_{A2}$ 216 and $PUCCH_{B2}$ 222 at the lower edge of uplink component carrier 208; and (iii) enhanced PUSCH region $PUSCH_E$ 232, which contains a contiguous set of resource blocks extending across both uplink component carrier 206 and uplink component carrier 208 between $PUCCH_{B1}$ 220 at the upper end of the uplink component carrier 206 and $PUCCH_{A2}$ 216 at the lower end of the uplink component carrier 208. The second half 230 of the enhanced subframe format 202 includes: (i) PUCCH regions $PUCCH_{A2}$ 216 and $PUCCH_{B2}$ 222 at the upper edge of uplink component carrier 206; (ii) PUCCH regions $PUCCH_{A1}$ 214 and $PUCCH_{B1}$ 220 at the lower edge of uplink component carrier 208; and (iii) enhanced PUSCH region $PUSCH_E$ 232, which contains a contiguous set of resource blocks extending across both uplink component carrier 206 and uplink component carrier 208 between $PUCCH_{B1}$ 220 at the upper end of the uplink component carrier 206 and $PUCCH_{A2}$ 216 at the lower end of the uplink component carrier 208.

The enhanced subframe format 202 provides frequency diversity for $PUCCH_{A1}$ 214, $PUCCH_{B1}$ 220, $PUCCH_{A2}$ 216, and $PUCCH_{B2}$ 222 by (i) reserving resource blocks for $PUCCH_{A1}$ 214 and $PUCCH_{B1}$ 220 at the upper edge of uplink component carrier 206 in the first half 228 of the enhanced subframe and at the lower edge of uplink component carrier 208 in the second half 230 the enhanced subframe, and (ii) reserving resource blocks for $PUCCH_{A2}$ 216 and $PUCCH_{B2}$ 222 at the lower edge of uplink component carrier 208 in the first half 228 of the enhanced subframe and at the upper edge of uplink component carrier 206 during the second half 230 of the enhanced subframe.

Further, enhanced subframe format 202 enables the base station to allocate transmission resources (i.e., bandwidth in the form of resource blocks/groups of 12 15 kHz subcarriers) to an individual UE for an SC-FDMA transmission having a transmission bandwidth that is 180 kHz times the number of contiguous resource blocks in $PUSCH_E$ 232 by (i) relocating $PUCCH_{B1}$ 220 from the upper edge of uplink component carrier 208 (its position in the non-enhanced subframe format) to the upper edge of uplink component carrier 206 adjacent to $PUCCH_{A1}$ 214 (its position in the enhanced subframe format) in the first half 228 of the enhanced subframe, and (ii) relocating $PUCCH_{B2}$ 222 from the upper edge of uplink component carrier 208 (its position in the non-enhanced subframe format) to the upper edge of uplink component carrier 206 adjacent to $PUCCH_{A2}$ 216 (its position in the enhanced subframe format) in the second half 230 of enhanced subframe. Enabling the base station to allocate up to the full set of contiguous resource blocks in $PUSCH_E$ 232 (and therefore the full contiguous spectrum corresponding to the full set of contiguous resource blocks in $PUSCH_E$ 232) both (i) increases the maximum bandwidth for individual SC-FDMA transmissions by UEs within the cell and (ii) enables the base station to allocate transmission bandwidth to UEs in the cell more flexibly and efficiently.

The example embodiment in FIG. 2 shows each uplink component carrier having two PUCCH regions ($PUCCH_{A1}$ 214 and $PUCCH_{A2}$ 216) for uplink component carrier 206 and two PUCCH regions ($PUCCH_{B1}$ 220 and $PUCCH_{B2}$ 222) for uplink component carrier 208. However, other embodiments may have fewer or more PUCCH regions. For example, a 1.4 MHz uplink carrier typically includes 1 PUCCH region comprising 2 resource blocks, a 2.5 MHz uplink carrier typically includes 2 PUCCH regions comprising 4 resource blocks, a 5 MHz uplink carrier typically includes 4 PUCCH regions comprising 8 resource blocks, a 10 MHz uplink carrier typically includes 8 PUCCH regions comprising 16 resource blocks, and a 20 MHz uplink carrier typically includes 16 PUCCH regions comprising 32 resource blocks.

For the example aggregated uplink carrier 200 shown in FIG. 2, regardless of the bandwidth of each uplink component carrier or the number of PUCCH regions in each uplink component carrier, in the enhanced subframe format: (i) the lower PUCCH regions of uplink component carrier 206 are positioned at the lower edge of uplink component carrier 208 adjacent to the lower PUCCH regions of uplink component carrier 208; (ii) the upper PUCCH regions of uplink component carrier 208 are positioned at the upper edge of uplink component carrier 206 adjacent to the upper PUCCH regions of uplink component carrier 206; and (iii) the enhanced PUSCH extends across the frequency boundary between uplink component carriers 206 and 208.

Similarly, in some embodiments, the aggregated uplink carrier may include more than two uplink component carriers. For example, in some embodiments, the aggregated uplink carrier may be formed from three, four, five, or more uplink component carriers.

Regardless of the number of contiguous uplink component carriers combined to form the aggregated uplink carrier, in the enhanced subframe format: (i) the lower PUCCH regions of each uplink component carrier are positioned near the lower edge of the lowermost uplink component carrier; (ii) the upper PUCCH regions of each uplink component carrier are positioned at the upper edge of the uppermost uplink component carrier; and (iii) the enhanced PUSCH extends across one or more frequency boundaries separating the plurality of uplink component carriers and is bookended by the upper PUCCH regions of the uplink component carriers at the upper edge of the uppermost uplink component carrier and the lower PUCCH regions of the uplink component carriers positioned at the lower edge of the lowermost uplink component carrier.

As noted above, the base station allocates resource blocks for uplink transmissions in either the enhanced subframe format or the non-enhanced subframe format. In operation, for some TTIs, the base station may allocate resource blocks in the enhanced subframe format and for other TTIs, the base station may allocate resource blocks in the non-enhanced subframe format. The ratio of TTIs during which the base station allocates resource blocks in the enhanced subframe format and the TTIs during which the base station allocates resource blocks in the non-enhanced subframe format may be based on any one or more of: (i) the number of enhanced subframe format capable UEs in the cell (i.e., UEs capable of transmitting data within the enhanced subframe format in response to receiving instructions from the base station to transmit within the enhanced subframe format); (ii) the ratio of enhanced subframe format capable UEs (i.e., UEs capable of transmitting data within the enhanced subframe format) to legacy UEs (i.e., UEs incapable of transmitting data within the enhanced subframe format); and/or (iii) an amount of traffic in upcoming TTIs that could benefit from being transmitted within the enhanced subframe format.

In some embodiments, the base station may consider whether a particular enhanced subframe format capable UE's requested transmission could benefit from being transmitted within the enhanced subframe format (e.g., if the size of the requested transmission exceeds a particular threshold), and if so, the base station may instruct that particular UE to send its requested transmission during one or more upcoming TTIs the have been scheduled by the base station to utilize the enhanced subframe format. In operation, the base station may need to instruct legacy UEs to refrain from transmitting PUCCH data (or at least PUCCH data in some PUCCH regions) during TTIs that have been scheduled to utilize the enhanced subframe format by, for example, sending one or more instructions to all UEs in the cell to inform the UEs about which future TTIs will use the enhanced subframe format and which future TTIs will use the non-enhanced subframe format.

Figure 3:
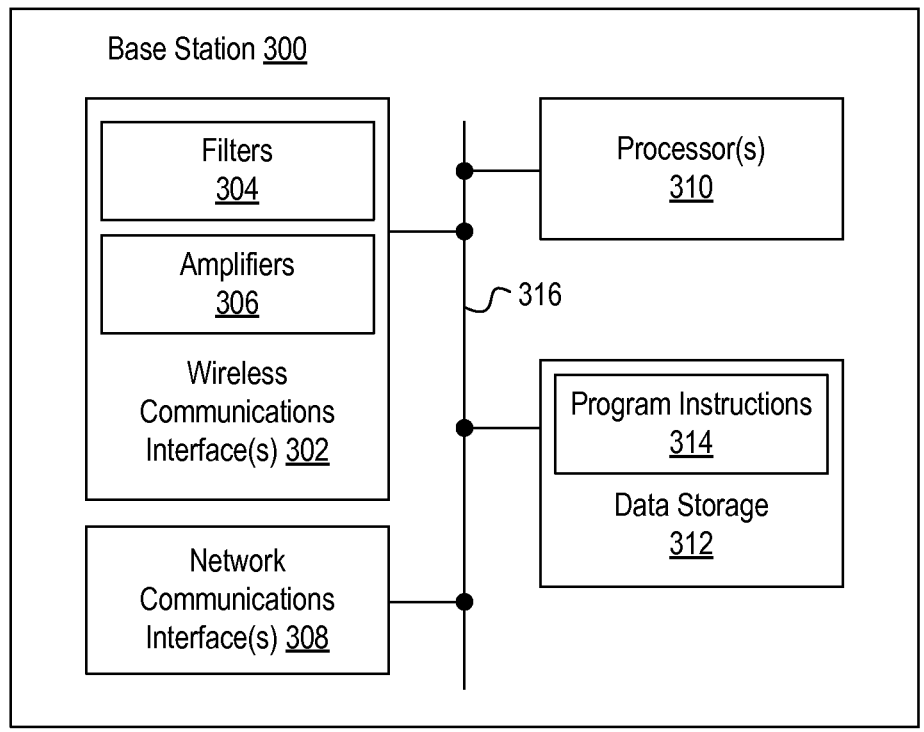
FIG. 3 is a simplified block diagram of an example base station according to some embodiments of the disclosed systems and methods.

FIG. 3 is a simplified block diagram of an example base station 300 according to some embodiments of the disclosed systems and methods, including, for example, base station 102 of FIG. 1. It will be appreciated that there can be numerous specific implementations of a base station, such as base station 300, in which the disclosed methods for using an enhanced PUSCH for uplink carrier aggregation transmissions could be implemented. As such, base station 300 is representative of a means for carrying out methods for using an enhanced PUSCH for uplink carrier aggregation transmissions, in accordance with the methods and steps described herein by way of example.

The example base station 300 includes one or more wireless communications interfaces 302, one or more network communications interfaces 308, one or more processors 310, and data storage 312, all of which may be coupled together by a system bus 316 or similar mechanism. In addition, the base station 300 may also include external storage, such as magnetic or optical disk storage (not shown). Variations from this arrangement are possible as well, including addition and/or omission of components, combination of components, and distribution of components in any of a variety of ways.

The base station components may be arranged to support wireless communications in a wireless communication network that is compliant with one or more of the variety of wireless air-interface protocols noted herein, in addition to other protocols now known or later developed. In particular, the components of the example base station 300 are configured to implement methods for using an enhanced PUSCH for uplink carrier aggregation transmissions in accordance with the example embodiments described herein.

The one or more wireless communications interfaces 302 may include one or more transmitters, receivers, transceivers, amplifiers 306, filters 304, antennas, and other associated components that enable the base station 300 to engage in air interface communication with one or more wireless communications devices, such as UE 104 shown in FIG. 1, according to any of the air interface protocols described herein (e.g., CDMA, GSM, LTE, etc.). The one or more amplifiers 306 and filters 304 are configured to support transmissions within a configured frequency range on (1) the downlink (or forward link) from the base station 300 to a wireless communications device and (2) the uplink (or reverse link) from the wireless communications device to the base station 300. Additionally, the one or more receivers are configured to receive UE transmissions on an aggregated uplink carrier comprising a plurality of contiguous uplink component carriers such as aggregated uplink carrier 200 shown and described with reference to FIG. 2, and the one or more transmitters are configured to send transmissions to UEs on one or more downlink carriers.

The one or more network interfaces 308 include physical network interfaces (e.g., optical, electrical) that enable the base station 300 to send and receive traffic directly or indirectly to/from other networks, such as the Public Switched Telephone Network (PSTN), the Internet, or other networks. The one or more network interfaces 308 may take the form of Ethernet network interface cards/ports, optical network interface cards/ports or other physical interfaces to one or more transmission networks that directly or indirectly connect the base station 300 to its neighboring base stations as well as to the PSTN, the Internet, and/or other networks.

The one or more processors 310 comprise one or more general-purpose processors (e.g., microprocessors) and/or one or more special-purpose processors (e.g., dedicated digital signal processors (DSPs), application specific integrated circuits (ASICs)). The non-transitory data storage 312 comprises one or more volatile and/or non-volatile storage components, such as magnetic or optical memory or disk storage. Non-transitory data storage 312 can be integrated in whole or in part with the one or more processors 310, as cache memory or registers for instance. As further shown, non-transitory data storage 312 is equipped to hold program instructions 314. In some embodiments, one or more of the processors 310 and non-transitory data storage 312 may be integrated in whole or in part with one or more of the wireless communications interfaces 302 and/or network communications interfaces 308.

The program instructions 314 comprise machine language instructions that define routines and software program code executable by the one or more processors 310 (alone or in combination with the wireless communications interface(s) 302 and network communications interface(s) 308) to carry out various functions described herein. In particular, the program code 314, wireless communications interfaces 302, and network communications interfaces 308 may operate cooperatively to carry out one or more aspects of the methods for bandwidth allocation methods described herein, including but not limited to allocating transmission resources for UE transmissions in an aggregated uplink carrier using an enhanced subframe format comprising a PUSCH region that extends across a plurality of contiguous uplink component carriers that form the aggregated uplink carrier according to any of the embodiments described herein.

Figure 4:
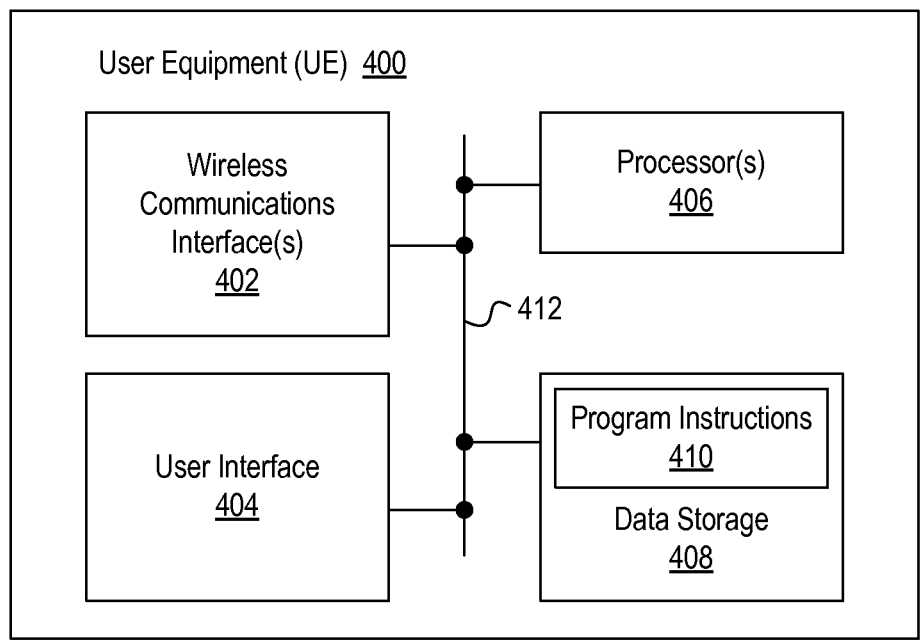
FIG. 4 is a simplified block diagram of an example UE according to some embodiments of the disclosed systems and methods.

FIG. 4 is a simplified block diagram of a UE 400 according to some embodiments of the disclosed systems and methods, including, for example, UE 104 shown in FIG. 1. The UE 400 is configured to operate in a communication system, such as the wireless communication system 100 of FIG. 1 for example, and may execute one or more functions described herein.

The UE 400 includes one or more wireless communication interfaces 402, one or more processors 406, a user interface 404, and non-transitory data storage 408 configured to store program instructions 410, all of which may be communicatively linked together by a system bus 412 or other similar mechanism. Variations from this arrangement are possible as well, including addition and/or omission of components, combination of components, and distribution of components in any of a variety of ways.

Wireless communication interface(s) 402 includes components (e.g., radios, antennas, communications processors) configured to engage in air interface communication within a configured frequency range of a wireless cell. For example, the wireless communication interface 402 may include one or more antenna structures and chipsets arranged to support wireless communication according to one or more air interface protocols, such as the ones disclosed and described herein (e.g., CDMA, GSM, LTE) and perhaps others (e.g., WiFi, Bluetooth, etc.)

The one or more processors 406 include one or more general purpose processors (e.g., microprocessors) and/or special purpose processors (e.g., application specific integrated circuits or the like). In some embodiments, the one or more processors 406 may be integrated in whole or in part with the one or more wireless communication interfaces 402.

The non-transitory data storage 408 comprises one or more volatile and/or non-volatile storage components. The storage components may include one or more magnetic, optical, and/or flash memory components for example. In some embodiments, the non-transitory data storage 308 may be integrated in whole or in part with the one or more processors 306 and/or the wireless communication interface (s) 402. Additionally or alternatively, the non-transitory data storage 308 may be provided separately as a non-transitory machine readable medium.

The non-transitory data storage 408 may hold (e.g., contain, store, or otherwise be encoded with) program instructions 410 (e.g., machine language instructions or other program logic, markup or the like) executable by the one or more processors 406 to carry out the various functions described herein. The non-transitory data storage 408 may also hold reference data for use in carrying out various functions described herein.

Figure 5:
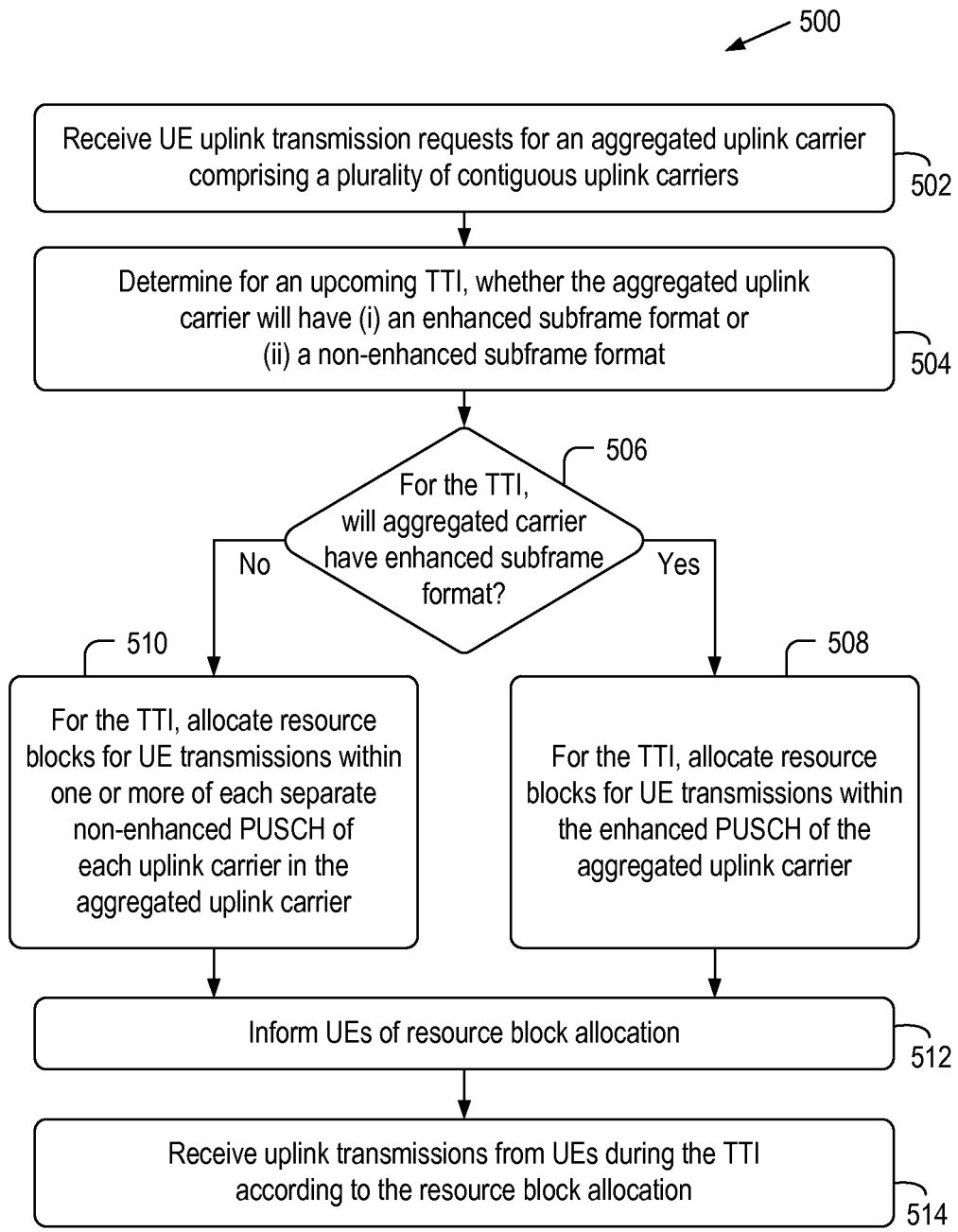
FIG. 5 is a flow chart depicting aspects of an example method implemented by a base station for allocating bandwidth of an aggregated uplink carrier comprising an enhanced subframe format according to embodiments of the disclosed systems and methods.

FIG. 5 is a flow chart depicting aspects of an example method 500 implemented by a base station for allocating bandwidth of an aggregated uplink carrier comprising an enhanced PUSCH according to embodiments of the disclosed systems and methods. The aggregated uplink carrier may be the same as or similar to any of the aggregated uplink carrier examples shown and described herein, including the aggregated uplink carriers shown and described with reference to FIGS. 1 and 2. For example, the aggregated uplink carrier may be formed from two, three, four, five, or perhaps more individual contiguous uplink component carriers, and each individual uplink component carrier may have a bandwidth of 1.4 MHz, 2.5 MHz, 3 MHz, 5 MHz, 10 MHz, 15 MHz, 20 MHz or perhaps some other bandwidth. Additionally, the individual contiguous uplink component carriers in the aggregated uplink carrier may have different bandwidths.

Method 500 starts at block 502, where the base station receives uplink transmission requests from UEs in the cell served by the base station. The base station may be similar to or the same as any of the base stations described herein, including but not limited to base station 102 (FIG. 1) or base station 300 (FIG. 2), for example. Similarly, the UEs may be similar to or the same as any of the UEs described herein, including but not limited to UE 104 (FIG. 104) or UE 400 (FIG. 400), for example.

At block 504, the base station determines for an upcoming TTI, whether the aggregated uplink carrier will use either (i) an enhanced subframe format or (ii) a non-enhanced subframe format. The enhanced subframe format may be the same as or similar to any of the enhanced subframe formats shown and described herein, including the enhanced subframe formats shown and described with reference to FIG. 2. Similarly, the non-enhanced subframe format may be the same as or similar to any of the non-enhanced subframe formats shown and described herein, including the non-enhanced subframe formats shown and described with reference to FIG. 2.

In operation, the base station may determine whether, for the upcoming TTI, the aggregated uplink should use either the enhanced subframe format or the non-enhanced subframe format based on any of the criteria described herein, including but not limited to one or more of: (i) the number of enhanced subframe format capable UEs in the cell; (ii) the ratio of enhanced subframe format capable UEs to legacy UEs in the cell; (iii) an amount of traffic in the upcoming TTI that could benefit from being transmitted within the enhanced subframe format; and/or (iv) any combination of the above-listed factors.

At block 506, if the upcoming TTI will use the enhanced subframe format, then method 500 advances to block 508, where for the upcoming TTI, the base station allocates resource blocks for UE transmissions within the enhanced PUSCH of the aggregated uplink carrier by determining which resource blocks in the enhanced PUSCH of the enhanced subframe will be used by individual UEs for transmitting their user data on the uplink to the base station during the upcoming TTI. The enhanced PUSCH of the aggregated uplink carrier may be arranged the same as or similar to any of the enhanced PUSCH configurations shown and described herein, including the enhanced PUSCH configurations shown and described with reference to FIG. 2. In operation, enhanced PUSCH includes a contiguous set of resource blocks that map to a continuous frequency range that extends across one or more frequency boundaries between one or more of the plurality of uplink component carriers.

However, if at block 506 the upcoming TTI will use the non-enhanced subframe format, then method 500 advances to block 510, where for the upcoming TTI, the base station allocates resource blocks for UE transmissions within one or more of each separate PUSCH of each uplink component carrier in the aggregated uplink carrier by determining which resource blocks in the one or more of each separate PUSCH of the non-enhanced subframe will be used by individual UEs for transmitting their user data on the uplink to the base station during the upcoming TTI. Each separate PUSCH of each individual uplink component carrier in the aggregated uplink carrier may be arranged the same as or similar to any of the PUSCH configurations in the non-enhanced subframe formats shown and described herein, including the PUSCH configurations in the non-enhanced subframe formats shown and described with reference to FIG. 2.

Regardless of whether the base station allocates resource blocks for the UE transmissions during the upcoming TTI within the enhanced subframe format or the non-enhanced subframe format, after the allocation step of block 508 or 510, method 500 advances to block 512 where the base station informs the UEs in the cell of the resource block allocation, including whether the base station has allocated resource blocks for the upcoming TTI according to the enhanced subframe format (having the enhanced PUSCH) or the non-enhanced subframe format (having a separate PUSCH for each uplink component carrier in the aggregated uplink carrier). In LTE embodiments, method block 512 may include sending DCI (Downlink Control Information) to the UEs in the cell in the PDCCH (Physical Downlink Control Channel).

After informing the UEs in the cell of the resource block allocation for the upcoming TTI at method block 512, method 500 advances to method block 514, where the base station receives uplink transmissions from UEs in the cell sent by the UEs during the TTI according to the resource block allocation performed in either block 508 or block 510. In LTE embodiments, the uplink transmissions from the UEs in the cell comprise SC-FMDA transmissions.

While various aspects have been disclosed herein, other aspects will be apparent to those of skill in the art. The various aspects disclosed herein are for purposes of illustration and are not intended to be limiting, with the true scope being indicated by the following claims, along with the full scope of equivalents to which such claims are entitled. It is also to be understood that the terminology used herein is for the purpose of describing particular example embodiments only, and is not intended to be limiting. For example, while the disclosed example embodiments focus on particular implementations of aggregated uplink carriers, the disclosed systems and methods are equally applicable to aggregated uplink carriers have different configurations that could benefit from allocating contiguous spectrum across multiple uplink carriers to UEs for uplink transmissions.

What is claimed is:

1. A method comprising:
in a wireless network comprising an aggregated uplink carrier for a carrier aggregation transmission, the aggregated uplink carrier comprising a plurality of separate, frequency-contiguous uplink component carriers in a wireless cell, a base station allocating bandwidth for User Equipment (UE) transmissions within the aggregated uplink carrier during an upcoming first Transmission Time Interval (TTI), wherein for the upcoming first TTI, the aggregated uplink carrier for the carrier aggregation transmission has an enhanced subframe format with an enhanced Physical Uplink Shared Channel (PUSCH) region that maps to a single continuous and undivided frequency range that extends across one or more frequency boundaries between two or more of the plurality of separate, frequency-contiguous uplink component carriers.

2. The method of claim 1, further comprising:
the base station notifying UEs in the wireless cell of the bandwidth allocation for the upcoming first TTI; and
the base station receiving a Single Carrier Frequency Division Multiple Access (SC-FDMA) transmission from at least one UE sent during the first TTI in response to having received the bandwidth allocation notification from the base station.

3. The method of claim 1, wherein the plurality of separate, frequency-contiguous uplink component carriers comprises a first uplink component carrier and a second uplink component carrier adjacent in frequency to the first uplink component carrier, and wherein the enhanced subframe format comprises (i) upper Physical Uplink Control Channel (PUCCH) regions for the first and second uplink component carriers at an upper end of the first uplink component carrier, (ii) lower PUCCH regions for the first and second uplink component carriers at a lower end of the second uplink component carrier, and (iii) the enhanced PUSCH region between the upper PUCCH regions and the lower PUCCH regions, wherein the enhanced PUSCH region is a single, uninterrupted range of frequencies, wherein the range of frequencies is contiguous with the end of the lower PUCCH regions and the beginning of the upper PUCCH regions.

4. The method of claim 1, further comprising:
the base station allocating bandwidth for UE transmissions in the aggregated uplink carrier during an upcoming second TTI, wherein for the upcoming second TTI, the aggregated uplink carrier has a non-enhanced subframe format different than the enhanced subframe format, wherein the non-enhanced subframe format for the aggregated uplink carrier comprises multiple, separate and non-continuous PUSCH regions, with a separate PUSCH region for each separate, frequency-contiguous uplink component carrier in the aggregated uplink carrier.

5. The method of claim 4, further comprising:
the base station notifying UEs in the wireless cell of the bandwidth allocation for the upcoming second TTI; and
the base station receiving an SC-FDMA transmission from at least one UE sent during the second TTI in response to having received the bandwidth allocation notification from the base station.

6. The method of claim 4, wherein the plurality of separate, frequency-contiguous uplink component carriers comprises a first uplink component carrier and a second uplink component carrier adjacent in frequency to the first uplink component carrier, and wherein the non-enhanced subframe format comprises (i) an upper PUCCH region of the first uplink component carrier at an upper end of the first uplink component carrier, (ii) a lower PUCCH region of the first uplink component carrier at a lower end of the first uplink component carrier, (iii) a first PUSCH region between the upper and lower PUCCH regions of the first uplink component carrier, (iv) an upper PUCCH region of the second uplink component carrier at an upper end of the second uplink component carrier, (v) a lower PUCCH region of the second uplink component carrier at a lower end of the second uplink component carrier, and (iv) a second PUSCH region between the upper and lower PUCCH regions of the second uplink component carrier.

7. The method of claim 4, wherein the base station is configured to choose for an upcoming third TTI, whether to allocate bandwidth within the enhanced subframe format or the non-enhanced subframe format.

8. The method of claim 7, wherein the choice of whether to allocate bandwidth within the enhanced subframe format or the non-enhanced subframe format in the upcoming third TTI is based at least in part on any one or more of: (i) a number of UEs in the wireless cell that are capable of transmitting data within the enhanced subframe format; (ii) a number of UEs in the wireless cell that are not capable of transmitting data within the enhanced subframe format; and/or (iii) an amount of traffic in the upcoming TTI that would benefit from being transmitted within the enhanced subframe format.

9. The method of claim 4, further comprising: the base station broadcasting on a downlink Physical Broadcast Channel (PBCH) associated with the aggregated uplink carrier, one or more messages informing UEs in the wireless cell about (i) upcoming TTIs during which the UEs should use the enhanced subframe format and (ii) upcoming TTIs during which the UEs should use the non-enhanced subframe format.

10. A base station comprising:
one or more wireless receivers configured to receive UE transmissions in a wireless cell on an aggregated uplink carrier for carrier aggregation transmission, the aggregated uplink carrier comprising a plurality of separate, frequency-contiguous uplink component carriers, wherein the UE transmissions comprise uplink transmission requests from UEs in the wireless cell;

one or more processors configured to allocate bandwidth for UE transmissions for an upcoming first TTI in the aggregated uplink carrier, wherein for the upcoming TTI, the aggregated uplink carrier for the carrier aggregation transmission has an enhanced subframe format with an enhanced PUSCH region that maps to a single, continuous and undivided frequency range that extends across one or more frequency boundaries between two or more of the plurality of separate, frequency-contiguous uplink component carriers; and one or more wireless transmitters configured to transmit an indication of the bandwidth allocation to the UEs in the wireless cell.

11. The base station of claim 10, wherein the plurality of separate, frequency-contiguous uplink component carriers comprises a first uplink component carrier and a second uplink component carrier adjacent in frequency to the first uplink component carrier, and wherein the enhanced subframe format comprises (i) upper PUCCH regions for the first and second uplink component carriers at an upper end of the first uplink component carrier, (ii) lower PUCCH regions for the first and second uplink component carriers at a lower end of the second uplink component carrier, and (iii) the enhanced PUSCH region between the upper PUCCH regions and the lower PUCCH regions, wherein the enhanced PUSCH region is a single, uninterrupted range of frequencies, wherein the range of frequencies is contiguous with the end of the lower PUCCH regions and the beginning of the upper PUCCH regions.

12. The base station of claim 10, wherein the one or more wireless receivers are configured to receive an SC-FDMA transmission from at least one UE sent during the first TTI in response to having received the bandwidth allocation notification from the base station.

13. The base station of claim 10, wherein the one or more processors are further configured to, in response to receiving the uplink transmission requests from the UEs in the wireless cell, allocate bandwidth for UE transmissions in the aggregated uplink carrier during an upcoming second TTI, wherein for the upcoming second TTI, the aggregated uplink carrier has a non-enhanced subframe format different than the enhanced subframe format, wherein the non-enhances subframe format for the aggregated uplink carrier comprises multiple, separate and non-continuous PUSCH regions, with a separate PUSCH region for each separate, frequency-contiguous uplink component carrier in the aggregated uplink carrier.

14. The base station of claim 13, wherein the one or more wireless receivers are further configured to receive an SC-FDMA transmission from at least one UE sent during the second TTI in response to having received the bandwidth allocation notification from the base station.

15. The base station of claim 13, wherein the plurality of separate, frequency-contiguous uplink carriers comprises a first uplink component carrier and a second uplink component carrier adjacent in frequency to the first uplink component carrier, and wherein the non-enhanced subframe format comprises (i) an upper PUCCH region of the first uplink component carrier at an upper end of the first uplink component carrier, (ii) a lower PUCCH region of the first uplink component carrier at a lower end of the first uplink component carrier, (iii) a first PUSCH region between the upper and lower PUCCH regions of the first uplink component carrier, (iv) an upper PUCCH region of the second uplink component carrier at an upper end of the second uplink component carrier, (v) a lower PUCCH region of the second uplink component carrier at a lower end of the second uplink component carrier, and (iv) a second PUSCH region between the upper and lower PUCCH regions of the second uplink component carrier.

16. The base station of claim 13, wherein the one or more processors are further configured to, in response to receiving the uplink transmission requests from the UEs in the wireless cell, choose for an upcoming third TTI, whether to allocate bandwidth within the enhanced subframe format or the non-enhanced subframe format.

17. The base station of claim 16, wherein the choice of whether to allocate bandwidth within the enhanced subframe format or the non-enhanced subframe format in the upcoming third TTI is based at least in part on any one or more of: (i) a number of UEs in the wireless cell that are capable of transmitting data within the enhanced subframe format; (ii) a number of UEs in the wireless cell that are not capable of transmitting data within the enhanced subframe format; and/or (iii) an amount of traffic in the upcoming TTI that would benefit from being transmitted within the enhanced subframe format.

18. The base station of claim 13, wherein the one or more wireless transmitters are further configured to transmit on a downlink PBCH associated with the aggregated uplink carrier, one or more messages informing UEs about (i) upcoming TTIs during which the UEs should use the enhanced subframe format and (ii) upcoming TTIs during which the UEs should use the non-enhanced subframe format.

19. A tangible, non-transitory computer-readable memory with instructions encoded thereon, wherein the instructions, when executed by one or more processors of a base station, cause the base station to perform functions comprising:

receiving UE transmissions in a wireless cell on an aggregated uplink carrier for carrier aggregation transmission, the aggregated uplink carrier comprising a plurality of separate, frequency-contiguous uplink component carriers, wherein the UE transmissions comprise uplink transmission requests from UEs;

in response to receiving the uplink transmission requests from the UEs, choosing for an upcoming TTI, whether to allocate transmission resources for the requested UE transmissions in the aggregated uplink carrier within one of either (i) an enhanced subframe format comprising an enhanced PUSCH region comprising a frequency-contiguous set of LTE resource blocks that map to frequency-contiguous subcarriers within a single, continuous and undivided frequency range that extends across one or more frequency boundaries between two or more of the plurality of separate, frequency-contiguous uplink component carriers, or (ii) a non-enhanced subframe format different than the enhanced subframe format, wherein the non-enhanced subframe format for the aggregated uplink carrier comprises multiple, separate and non-continuous PUSCH regions, with a separate PUSCH region within each separate, frequency-contiguous uplink component carrier in the aggregated uplink carrier;

in response to choosing to allocate transmission resources for the requested UE transmissions in the aggregated uplink carrier within the enhanced subframe format, allocating transmission resources for the requested UE transmissions within the enhanced subframe format; and transmitting to UEs in the wireless cell, an indication of the transmission resource allocation for the upcoming TTI.

20. The tangible, non-transitory computer-readable memory of claim 19,
wherein the plurality of separate, frequency-contiguous uplink carriers comprises a first uplink component carrier and a second uplink component carrier adjacent in frequency to the first uplink component carrier, and wherein the enhanced subframe format comprises (i) upper PUCCH regions for the first and second uplink component carriers at an upper end of the first uplink component carrier, (ii) lower PUCCH regions for the first and second uplink component carriers at a lower end of the second uplink component carrier, and (iii) the enhanced PUSCH region between the upper PUCCH regions and the lower PUCCH regions, wherein the enhanced PUSCH region is a single, uninterrupted range of frequencies, wherein the range of frequencies is contiguous with the end of the lower PUCCH regions and the beginning of the upper PUCCH regions; and
wherein the non-enhanced subframe format comprises (i) an upper PUCCH region of the first uplink component carrier at an upper end of the first uplink component carrier, (ii) a lower PUCCH region of the first uplink component carrier at a lower end of the first uplink component carrier, (iii) a first PUSCH region between the upper and lower PUCCH regions of the first uplink component carrier, (iv) an upper PUCCH region of the second uplink component carrier at an upper end of the second uplink component carrier, (v) a lower PUCCH region of the second uplink component carrier at a lower end of the second uplink component carrier, and (iv) a second PUSCH region between the upper and lower PUCCH regions of the second uplink component carrier.

* * * * *